United States Patent
Braun et al.

(10) Patent No.: US 11,718,783 B2
(45) Date of Patent: Aug. 8, 2023

(54) METHOD FOR PREPARING A COMPOSITION COMPRISING A HYDROSOLUBLE (CO)POLYMER ENCAPSULATED IN A SHELL AND USE OF THIS COMPOSITION IN ASSISTED OIL AND GAS RECOVERY

(71) Applicant: SNF Group, Andrezieux Boutheon (FR)

(72) Inventors: Olivier Braun, Andrezieux Boutheon (FR); Lionel Lauber, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 50 days.

(21) Appl. No.: 16/768,355

(22) PCT Filed: Dec. 12, 2018

(86) PCT No.: PCT/EP2018/084575
§ 371 (c)(1),
(2) Date: May 29, 2020

(87) PCT Pub. No.: WO2019/115619
PCT Pub. Date: Jun. 20, 2019

(65) Prior Publication Data
US 2020/0362229 A1    Nov. 19, 2020

(30) Foreign Application Priority Data
Dec. 14, 2017    (FR) .......................................... 1762196

(51) Int. Cl.
*E21B 43/16* (2006.01)
*C09K 8/588* (2006.01)
(Continued)

(52) U.S. Cl.
CPC ............ *C09K 8/588* (2013.01); *C08F 220/56* (2013.01); *C09K 8/584* (2013.01); *E21B 43/16* (2013.01); *C08F 2800/20* (2013.01)

(58) Field of Classification Search
None
See application file for complete search history.

(56) References Cited

U.S. PATENT DOCUMENTS

| 4,525,496 A | * | 6/1985 | Adaway ................ C09K 8/584 523/337 |
| 7,700,702 B2 | | 4/2010 | Gaillard et al. |

(Continued)

FOREIGN PATENT DOCUMENTS

| CN | 106496389 A | * | 3/2017 | .......... B01F 17/0035 |
| FR | 2868783 A1 | | 10/2005 | |

(Continued)

OTHER PUBLICATIONS

Griffin, W.C., "Classification of Surface-Active Agents by 'HLB'", Journal of the Society of Cosmetic Chemists 1 (1949): 311-326.
(Continued)

*Primary Examiner* — Charles R Nold
(74) *Attorney, Agent, or Firm* — Heslin Rothenberg Farley & Mesiti P.C.

(57) ABSTRACT

The invention concerns a method for preparing a dispersion of a hydrophilic phase in a lipophilic phase, comprising:—a hydrophilic phase comprising at least one water-soluble (co)polymer, —a lipophilic phase, —at least one interface polymer consisting of at least one monomer of formula (I): Formula (I) in which, —R1, R2, R3 are separately a hydrogen atom, a methyl group, a carboxylate group and Z—X, —Z is chosen from the group comprising C(=O)—O; C(=O)—NH; O—C(=O); NH—C(=O)—NH; NH—C(=O)—O; and a saturated or unsaturated, substituted or unsubstituted carbon chain comprising 1 to 20 carbon atoms
(Continued)

capable of comprising one or more heteroatoms chosen from nitrogen and oxygen, —X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain.

20 Claims, 3 Drawing Sheets

(51) Int. Cl.
*C09K 8/584* (2006.01)
*C08F 22/00* (2006.01)
*C08F 220/56* (2006.01)

(56) References Cited

U.S. PATENT DOCUMENTS

| | | |
|---|---|---|
| 7,897,546 B2 | 3/2011 | Showalter et al. |
| 9,290,588 B2 | 3/2016 | Blondel et al. |
| 2011/0312858 A1 | 12/2011 | Holt |
| 2012/0292029 A1 | 11/2012 | Soucy |
| 2015/0041143 A1 | 2/2015 | Remy et al. |
| 2017/0335253 A1* | 11/2017 | Man .......... C11D 3/044 |
| 2018/0112119 A1* | 4/2018 | Wu .......... C11D 1/004 |

FOREIGN PATENT DOCUMENTS

| | | | |
|---|---|---|---|
| RU | 2511444 C2 * | 4/2014 | ........ C09K 8/512 |
| WO | 83/00337 A1 | 2/1983 | |
| WO | 2010/133258 A1 | 11/2010 | |
| WO | 2011/113470 A1 | 9/2011 | |
| WO | 2013/108173 A1 | 7/2013 | |
| WO | 2014/075964 A1 | 5/2014 | |
| WO | 2014/128400 A1 | 8/2014 | |

OTHER PUBLICATIONS

Thomas, S., "Enhanced Oil Recovery—An Overview", Oil & Gas Science and Technology—Rev. IFP, vol. 63, No. 1, pp. 9-19 (2008).

* cited by examiner

METHOD FOR PREPARING A COMPOSITION COMPRISING A HYDROSOLUBLE (CO)POLYMER ENCAPSULATED IN A SHELL AND USE OF THIS COMPOSITION IN ASSISTED OIL AND GAS RECOVERY

CROSS REFERENCE TO RELATED APPLICATIONS

This application is a national stage filing under section 371 of International Application No. PCT/EP2018/084575 filed on Dec. 12, 2018, and published on Jun. 20, 2019 as WO 2019/115619, which claims priority to French Application No. 1762196, filed on Dec. 14, 2017. The entire contents of WO 2019/115619 are hereby incorporated herein by reference.

FIELD OF THE INVENTION

The present invention relates to a method for preparing a composition comprising at least one water-soluble (co) polymer encapsulated in a shell.

Another feature of the invention relates to an enhanced oil and gas recovery method using said composition.

DESCRIPTION OF THE PRIOR ART

Most of the oil fields exploited currently have become mature and have therefore started to decline in production or are about to. The recovery level for these fields is currently of the order of 15 to 35% on average relative to the initial quantity of oil. Therefore, they offer a still considerable production potential.

Generally, crude oil contained in deposits is recovered in several stages.

The production results first from the natural energy of the fluids and rock that decompress. After this depletion phase, the quantity of oil recovered at the surface represents on average about 5 to 15% of the initial reserve. It is therefore necessary, in a second stage, to employ techniques targeting increased recovery yields while maintaining the pressure in the field.

The method most frequently implemented consists of injecting water into the deposit through injection wells dedicated to this purpose. This is called secondary recovery. This second phase stops when the water/oil ratio is too high, i.e. when the quantity of water in the mixture produced by producing well is too high. This secondary recovery produces additional recovery of the order of 10 to 20%.

The other techniques that can be used are together called enhanced oil recovery (EOR). Their goal is to recover between 10 and 35% of additional oil relative to the initial oil quantity. Diverse treatments with or without heat are known under the term enhanced oil recovery, such as techniques called electric, miscible, vapor, and chemical techniques for improved recovery of remaining oil (See "Oil & Gas Science and Technology"—IFP review, vol 63 (2008) No. 1, pp 9-19).

"Oil" means any type of oil, i.e. both light and heavy oil, or even bitumen. An oil generally results from the natural transformation of organic material and is composed of a mixture of hydrocarbons. In the description of the prior art or of the invention, the terms "petroleum" and "oil" are used to denote the same material, with the exception of statements about the composition of an emulsion or dispersion.

The efficacy of flushing by water injection is generally improved through the addition of water-soluble (co)polymers. The expected and proven benefits of using the (co) polymer, through the "viscosification" of injected waters, are improved flushing and reduced viscosity contrast between the fluids, to control their mobility ratio in the field, so as to recover the oil quickly and effectively. These (co)polymers increase the water's viscosity.

It is known to the person skilled in the art that synthetic water-soluble (co)polymers, particularly acrylamide-based (co)polymers, are very advantageous (co)polymers for increasing the viscosity of aqueous solutions; they are therefore the primary kind used in assisted recovery.

However acrylamide polymers are sensitive to chemical, biological and mechanical degradations. Solutions have been proposed in documents WO 2010/133258 and WO 2013/108173 to improve the resistance of the polymers to chemical degradations and to high temperatures. Other solutions have been proposed in documents U.S. 2012/0292029 and U.S. 2015/041143 to prevent mechanical polymer degradation by using a suitable material.

Document U.S. Pat. No. 7,897,546 describes the use of highly crosslinked, encapsulated, expandable polymer microparticles to modify water permeability in an underground reservoir. These microparticles obtained are water-swelling. Their swelling in some areas of the formation allows said areas to be clogged by the formation of a gel.

Document U.S. 2011/0312858 describes the use of a capsule made from borosilicate glass containing a chemical compound in the oil field for the drilling, cementing and stimulation steps. The compound can be a water-swellable polymer.

Document WO 83/00337 discloses a "self-reversing" water-in-oil emulsion used in an enhanced oil recovery method. This emulsion comprises an aqueous phase containing a water-soluble polymer of the polyacrylamide type. It further comprises an emulsifier of the water-in-oil type and a reversing agent that allows the self-reversal of the emulsion. The water-soluble polymer is not enveloped by a polymer breaking down in the underground formation.

These different polymers, which may or may not be encapsulated, are not suitable for the application of enhanced oil recovery by flushing given that they cannot propagate far into the formation and therefore cause uniform and effective flushing of the reservoir. In fact, the gel, due to its selective placement, alters the flushing of the reservoir and does not have the function of pushing the oil. The conformance treatment is specific and has the goal of modifying the permeability of the reservoir in a localized manner The problem that the Applicant proposes to address is to be able to inject an aqueous composition containing polymers in the context of enhanced oil or gas recovery operation(s) by flushing of an underground formation while avoiding the mechanical and chemical degradation of the polymers during the injection of the composition and within the underground formation.

DISCLOSURE OF THE INVENTION

The invention relates to a method for preparing a dispersion of a hydrophilic phase in a lipophilic phase. This dispersion comprises:
  a hydrophilic phase comprising at least one water-soluble (co)polymer,
  a lipophilic phase, at least one interface polymer composed of at least one monomer of formula (I):

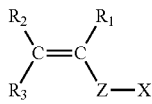

Formula (I)

wherein,

R1, R2, R3 are separately chosen from the group comprising a hydrogen atom, a methyl group, a carboxylate group and Z—X, Z is chosen from the group comprising C(=O)—O; C(=O)—NH; O—C(=O); NH—C(=O)—NH; NH—C(=O)—O; and a saturated or unsaturated, substituted or unsubstituted carbon chain comprising 1 to 20 carbon atoms capable of comprising one or more heteroatoms chosen from nitrogen and oxygen, X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain.

"Polymer composed of at least one monomer" is used to denote a polymer obtained from a plurality of molecules of at least one monomer. Thus, a polymer of a monomer corresponds to a polymer obtained from a plurality of repeat units of molecules of a monomer.

The Hydrophilic Phase in Lipophilic Phase Dispersion

The composition obtained according to the invention is a dispersion of a hydrophilic phase in a lipophilic phase. In other words, the lipophilic phase is the continuous phase and the hydrophilic phase is the dispersed phase. The interface polymer is placed at the interface between the hydrophilic phase and the lipophilic phase. Preferably, the hydrophilic phase is an aqueous phase and the lipophilic phase is an oil phase. Thus, the composition obtained according to the invention is advantageously a water-in-oil dispersion, more advantageously a water-in-oil emulsion.

The interface polymer obtained by the polymerization of at least one monomer of formula (I) forms a shell at the interface of the hydrophilic phase and the lipophilic phase. In general, the shell withstands mechanical stresses such as shear, and more specifically shear while the polymer solution is prepared, during its injection through valves, chokes and other restrictions with passage speeds greater than 3 meters per second, or during the flushing of an underground formation near the layer-hole connection. The shell also withstands chemical stresses that may be caused by the presence of oxygen, $H_2S$ or metals during the injection phase. Preferably, the shell is semi-permeable.

As already indicated, preferably, the dispersion is in the form of a reverse emulsion.

In general, the hydrophilic phase assumes the form of micrometric droplets dispersed, advantageously emulsified, in the lipophilic phase. The mean size of these droplets is advantageously between 0.01 and 30 μm, more advantageously between 0.05 and 3 μm. The interface polymer is therefore placed at the interface between the hydrophilic phase and the lipophilic phase at each droplet. The mean size of the droplets is advantageously measured with a laser measuring device using conventional techniques that are part of the general knowledge of the person of skill in the art. A device like the Mastersizer by Malvern may be used for this.

Generally, the dispersion obtained according to the invention contains between 10 and 65 wt % of water-soluble (co)polymer, more advantageously between 30 and 60 wt %.

Furthermore, the dispersion obtained according to the invention has a hydrophilic phase/lipophilic phase weight ratio advantageously of between 0.1 and 100, more advantageously between 1 and 80, and still more advantageously between 10 and 60.

The Water-Soluble (Co)Polymer of the Hydrophilic Phase

The water-soluble (co)polymer can be a natural polymer, for example xanthan gums, guar gums, schizophyllan, scleroglucan or other compounds in the polysaccharide family, or a synthetic or semi-synthetic (co)polymer. Preferably, the water-soluble (co)polymer is a synthetic (co)polymer.

When the water-soluble (co)polymer is a synthetic (co)polymer, it is preferably a (co)polymer obtained from at least one nonionic monomer and/or at least one anionic monomer and/or at least one cationic monomer and/or a zwitterionic monomer.

The nonionic monomer or monomers that can be used in the scope of the invention can be chosen, in particular, in the group comprising water-soluble vinyl monomers. The nonionic monomer does not comprise the monomers of formula (I). Preferred monomers belonging to this class are, for example, acrylamide, methacrylamide, N-isopropylacrylamide, N,N-dimethylacrylamide and N-methylolacrylamide. It is also possible to use N-vinylformamide, N-vinyl acetamide, N-vinylpyridine and N-vinylpyrrolidone, acryloyl morpholine (ACMO), glycidyl methacrylate, glyceryl methacrylate and diacetone acrylamide. A preferred nonionic monomer is acrylamide.

The anionic monomer or monomers are preferably chosen from among acrylic acid, methacrylic acid, itaconic acid, maleic acid, acrylamido tertiary butyl sulfonic acid (also called ATBS or 2-acrylamido-2-methylpropane sulfonic acid), vinylsulfonic acid, vinylphosphonic acid, said anionic monomer being non-salified, partially or totally salified, and the 3-sulfopropyl methacrylate salts. The salified form advantageously corresponds to the salts of alkali metals (Li, Na, K . . . ), alkaline earth metals (Ca, Mg . . . ) or ammonium, in particular quaternary ammoniums.

Hereinabove and hereinafter, the cationic monomers and the anionic monomers, for example MADAME and ATBS, include the non-salified, salified, partially and fully salified forms.

The cationic monomer or monomers that can be used in the scope of the invention may be chosen, notably from among monomers of the acrylamide, acrylic, vinyl, allyl or maleic type having a quaternary ammonium function by salification or quaternization. Mention may be made, in particular and in a non-limiting way, of quaternized dimethylaminoethyl acrylate (ADAME), quaternized dimethylaminoethyl acrylate, (MADAME), dimethyldiallylammonium chloride (DADMAC), acrylamido propyltrimethyl ammonium chloride (APTAC) and methacrylamido propyltrimethyl ammonium chloride (MAPTAC).

The cationic monomer ou monomers can also be chosen from the hydrophobic cationic monomers described in patent FR 2,868,783.

Zwitterionic monomer or monomers can also be used in the context of the invention; they combine both the anionic and cationic charges on a single and same monomer. They can in particular be chosen from betaine, sultaine, sulfobetaine, phosphobetaine and carboxybetaine monomers. Examples of zwitterionic monomers include sulfopropyl dimethylammonium ethyl methacrylate, sulfopropyl dimethylammonium propylmethacrylamide, sulfopropyl 2-vinylpyridinium, and phosphato ethyl trimethylammonium ethyl methacrylate.

According to a specific embodiment of the invention, the water-soluble (co)polymer is composed solely of ATBS.

The water-soluble (co)polymer preferably is an acrylamide-based anionic (co)polymer, preferably a (co)polymer of acrylamide and acrylamide tertiary butyl sulfonic acid (ATBS) optionally partially post-hydrolyzed, more preferably a ter(co)polymer of acrylamide, acrylic acid and acrylamide tertiary butyl sulfonic acid (ATBS).

The water-soluble (co)polymer preferably contains between 10% and 50% mol of anionic monomer(s), more preferably between 20% and 45% mol.

The water-soluble (co)polymer preferably contains between 50% and 90% mol of nonionic monomer(s), more preferably between 60% and 75% mol.

In a preferred manner, the water-soluble (co)polymer contains only monomeric anionic and nonionic units. In other words, it is preferably obtained from at least one anionic monomer and at least one nonionic monomer.

According to the invention, the water-soluble (co)polymer may have a linear, branched, star-shaped or comb-shaped structure. These structures may be obtained by the selection of the initiator, transfer agent, polymerization technique, such as controlled radical polymerization known as RAFT (reversible-addition fragmentation chain transfer), NMP (nitroxide-mediated polymerization) or ATRP (atom-transfer radical polymerization), incorporation of structural monomers, or concentration, etc. The general knowledge of one skilled in the art allows him to prepare a water-soluble (co)polymer having one of these types of structure.

According to the invention, the water-soluble (co)polymer is advantageously linear or structured. Structured (co)polymer (branched, star, comb) denotes a non-linear (co)polymer that has side chains so as to obtain, when this (co)polymer is dissolved in water, a high state of tangling leading to very high viscosities at low gradients. The water-soluble polymer is not cross-linked.

In the case where the (co)polymer is structured, it can be structured:

by at least one structure agent, which can be chosen from the group comprising unsaturated polyethylene monomers (having at least two unsaturated functions), such as for example vinyl, allyl, acrylic and epoxy functions and for example mention may be made of methylene-bis-acrylamide (MBA), triallyamine, or by macroinitiators such as polyperoxides, polyazoics and poly transfer agents such as polymercaptan (co)polymers.

According to a specific embodiment, the water-soluble (co)polymer may comprise at least one LCST group.

According to the general knowledge of a person skilled in the art, LCST groups correspond to groups whose water solubility for a determined concentration is modified beyond a certain temperature and as a function of the salinity. This is a group having a heating transition temperature defining its lack of affinity with the solvent medium. The lack of affinity with the solvent results in opacification or loss of transparency, which may be due to precipitation, aggregation, gelification, or viscosification of the medium. The minimum transition temperature is known as "LCST" (Lower Critical Solution Temperature). For each concentration of the LCST group, a heating transition temperature is observed. It is greater than the LCST, which is the lowest point in the curve. Below this temperature, the (co)polymer is soluble in water, above this temperature, the (co)polymer loses its solubility in water.

According to a specific embodiment, the water-soluble (co)polymer may comprise at least one UCST group.

According to the general knowledge of a person skilled in the art, UCST groups correspond to groups whose water solubility for a determined concentration is modified below a certain temperature and as function of the salinity. This is a group having a cooling transition temperature defining its lack of affinity with the solvent medium. The lack of affinity with the solvent results in opacification or loss of transparency, which may be due to precipitation, aggregation, gelification, or viscosification of the medium. The maximum transition temperature is known as "UCST" (Upper Critical Solution Temperature). For each concentration of the UCST group, a cooling transition temperature is observed. It is greater than the LCST, which is the lowest point in the curve. Above this temperature, the (co)polymer is soluble in water; below this temperature, the (co)polymer loses its water solubility.

According to the invention, the (co)polymer has an advantageously high molecular weight. "High molecular weight" denotes molecular weights of at least 1 million g/mol, preferably between 2 and 40 million g/mol, more preferably between 5 and 30 million g/mol. Molecular weight is understood as average molecular weight by weight.

The Interface Polymer

As already indicated, the interface polymer is obtained from at least one monomer of formula (I):

Formula (I)

wherein,

R1, R2, R3 are separately chosen from the group comprising a hydrogen atom, a methyl group, a carboxylate group and Z—X, Z is chosen from the group comprising C(=O)—O; C(=O)—NH; O—C(=O); NH—C(=O)—NH; NH—C(=O)—O; and a saturated or unsaturated, substituted or unsubstituted carbon chain comprising 1 to 20 carbon atoms capable of comprising one or more heteroatoms chosen from nitrogen and oxygen, X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain.

Thus, X can in particular be one of the following groups:

an alkanolamide, preferably with formula diethanolamide monooleate (Witcamide 511), stearoyl ethanolamide (Witcamide 70), oleic acid monoisopropanolamide (Witcamide 61), isostearic acid monoisopropanolamide (Witcamide SPA), coconut acid monoisopropanolamide (Empilan CLS), coconut acid monoethanolamide, oleic acid diethanolamide (Mexanyl), oleyl monoisopropanolamide (Simaline IE 101)

a sorbitan ester, for example and non-exhaustively a sorbitan monolaurate (Span 20), sorbitan monopalmitate (Span 40), sorbitan monostearate (Span 60), sorbitan monoisostearate (Span 70), sorbitan tristearate (Span 65), sorbitan monooleate (Span 80), sorbitan sesquioleate (Span 83) or sorbitan trioleate (Span 85)

an ethoxylated sorbitan ester, preferably with formula polyethylene glycol sorbitan monolaurate (Tween 20), polyethylene glycol sorbitan monopalmitate (Tween 40), polyethylene glycol sorbitan monostearate (Tween 60), polyethylene glycol sorbitan monooleate (Tween 80) or polyethylene glycol sorbitan trioleate (Tween 85)

a glyceryl ester, preferably with formula polyglycerol monolaurate (Decaglyn 1L), polyglycerol myristate (Decaglyn 1-M), polyglycerol decaoleate (Polyaldo 10-10-0), polyglycerol distearate (Polyaldo 6-2-S), polyglycerol oleate (Polyaldo 10-1-0), polyglycerol caprate (Polyaldo 10-1 CC KFG), polyglycerol stearate (Polyaldo 10-1-S)

a polyglucoside, preferably with formula decyl glucoside (Triton BG-10), lauryl glucoside (Plantacare 1200 UP), capryl glucoside (Plantacare 810 UP), butyl glucoside (Simulsol SL 4), heptyl glucoside (Simulsol SL 7 G), octyl and decyl glucoside (Simulsol SL 8), decyl glucoside (Simulsol SL 10), undecyl glucoside (Simulsol SL 11 W), decyl & hexadecyl glucoside (Simulsol SL 26), octyl & hexadecyl glucoside (Simulsol SL 826).

According to one specific embodiment, the monomer of formula (I) has an HLB value advantageously of less than 4.5, and advantageously of at least 1.

The HLB ("hydrophilic—lipophilic balance") value makes it possible to quantify the balance existing between the hydrophilic part and the lipophilic part of a molecule. This value is determined by calculating the values of the different parts of the molecule, as described by Griffin in 1949 (Griffin W C, Classification of Surface-Active Agents by HLB, Journal of the Society of Cosmetic Chemists 1 (1949): 311).

In the present invention, the Griffin method, used conventionally, is based on calculating values of the chemical groups of the molecule. Griffin assigned a value of between 0 and 20, thus providing information on the solubility in a hydrophilic environment and in a lipophilic environment of the molecule. Thus, the substances having an HLB of 10 are distributed evenly in the two phases, namely the hydrophilic part in the hydrophilic phase and the hydrophobic part in the lipophilic phase.

HLB=20(Mh/M)

M: the molecular weight of the molecule
Mh: the molecular weight of the hydrophilic part.

According to one preferred embodiment, the monomer of formula (I) has the following formula:

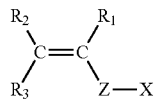

wherein,

R1, R2, R3 separately are a hydrogen atom or a methyl group,

Z is chosen from the group comprising $CH_2$, C(=O)—O, C(=O)—NH, and —(C=O)—O—$CH_2$—CH(OH)—$CH_2$, X is a group chosen from alkanolamides and sorbitan esters, and comprising a saturated or unsaturated, linear, branched or cyclic, optionally aromatic, hydrocarbon chain.

According to one preferred embodiment, the monomer of formula (I) is chosen from the (meth)acrylate of the sorbitan monooleate, the 2-hydroxypropyl (meth)acrylate of the diethanolamide monooleate or the glyceryl (meth)acrylate or the sorbitan monooleate.

According to one preferred embodiment, the monomer of formula (I) is as follows:

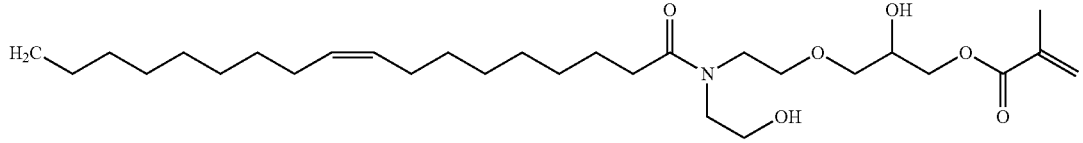 [SMILES: C=C(C)C(=O)OCC(O)COCCN(CCO)C(=O)CCCCCCC/C=C\CCCCCCCC]

This preferred monomer corresponds to the formula $H_3C$—$(CH_2)_7$—CH=CH—$(CH_2)_7$—C(=O)—N($CH_2CH_2OH$)—$(CH_2)_2$—O—$CH_2$—CH(OH)—$CH_2$—O—C(=O)—C($CH_3$)=$CH_2$.

In one particular embodiment of the invention, the interface polymer is obtained by the polymerization of at least one monomer of formula (I).

In one particular embodiment, the interface polymer is obtained by the polymerization of at least one monomer of formula (I) and of at least one nonionic monomer and/or at least one anionic monomer and/or at least one cationic monomer.

The different monomers used may be selected from the respective lists mentioned previously in the description of the water-soluble (co)polymer.

Advantageously, the interface polymer comprises between 0.0001 and 10%, more advantageously between 0.0001 and 5%, and still more advantageously between 0.0001 to 1% of monomers of formula (I), by weight relative to the total weight of monomers.

If applicable, the interface polymer comprises between 50 and 99.9999%, more advantageously between 60 and 99.9999% of nonionic monomers (distinct from the monomer with formula (I)), by weight relative to the total weight of monomers.

If applicable, the interface polymer comprises between 10 and 99.9999%, more advantageously between 20 and 99.9999% of anionic monomer, by weight relative to the total weight of monomers.

If applicable, the interface polymer comprises between 1 and 99.9999%, more advantageously between 10 and 99.9999% of cationic monomers, by weight relative to the total weight of monomers.

The Shell

According to the invention, the interface polymer forms a shell around the droplets forming the hydrophilic phase. Aside from the monomers mentioned above, the interface polymer may comprise at least one structure agent. The structure agent is advantageously chosen from diamine diacrylamides or methacrylamides; di-, tri- or tetrahydroxy acrylics esters; di-, tri- or tetrahydroxy methacrylic esters; divinyl compounds preferably separated by an azo group; diallyl compounds preferably separated by an azo group; vinyl esters of di- or tri-functional acids; allyl esters of di- or tri-functional acids; methylenebisacrylamide; diallylamine; triallylamine; tetraallylammonium chloride; divinylsulfone; polyethylene glycol dimethacrylate and diethylene glycol diallyl ether.

Preparation Method

As already indicated, the invention relates to a method for preparing the dispersion as described above.

According to the invention, the water-soluble (co)polymer is advantageously obtained by inverse emulsion or inverse microemulsion polymerization. This polymerization technique is well known to the person skilled in the art. It consists of emulsifying, in a lipophilic phase, a hydrophilic phase containing the monomer or monomers. This emulsification generally occurs using a water-in-oil surfactant. After polymerization of the monomer or monomers, an oil-in-water surfactant is optionally added to later help the inversion of the emulsion in water.

The lipophilic phase of the dispersion obtained according to the invention comprises at least one lipophilic solvent. The lipophilic phase is advantageously chosen from hydrocarbon oils having a boiling point of at least 100° C., preferably of at least 135° C., more preferably of at least 180° C. Preferably, the lipophilic phase is chosen from hydrocarbon oils having a boiling point not exceeding 200° C. If the oil has a boiling range, the term "boiling point" refers to the lower limit of the boiling range.

The lipophilic solvent is advantageously a hydrocarbon oil. This hydrocarbon oil can be chosen from aliphatic hydrocarbons, aromatic hydrocarbons or mixtures of these oils. Examples of these oils include, but are not limited to, solvents not miscible in water, such as paraffinic hydrocarbons; naphthene hydrocarbons; aromatic hydrocarbons; olefins; and mixtures thereof The paraffinic hydrocarbons may be saturated, linear or branched paraffinic hydrocarbons. The aromatic hydrocarbons comprise, but are not limited to, toluene and xylene. The oil can be chosen from plant oils, for example soy oil, canola oil, or any other oil produced from the seed of any one of several varieties of the canola plant. The oil can be derived from renewable raw materials such as isoamyl laurate or renewable iso-paraffins, such as those distributed by the company Total under the Biolife brand.

According to one particular embodiment of the invention, the polymerization of the interface polymer is done during the polymerization of the water-soluble (co)polymer of the hydrophilic phase. In other words, and more specifically, one particular method according to the invention for preparing a dispersion of a hydrophilic phase in a lipophilic phase comprises the following steps:

a) Preparing a hydrophilic phase comprising at least one monomer different from the monomer of formula (I), b) Preparing a lipophilic phase comprising a lipophilic solvent and at least one monomer of formula (I):

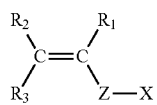

Formula (I)

wherein,

R1, R2, R3 are separately chosen from the group comprising a hydrogen atom, a methyl group, a carboxylate group and Z—X, Z is chosen from the group comprising C(=O)—O; C(=O)—NH; O—C(=O); NH—C(=O)—NH; NH—C(=O)—O; and a saturated or unsaturated, substituted or unsubstituted carbon chain comprising 1 to 20 carbon atoms capable of comprising one or more heteroatoms chosen from nitrogen and oxygen, X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain, c) introducing the hydrophilic phase into the lipophilic phase with stirring in order to form a dispersion of hydrophilic phase in lipophilic phase, d) once the dispersion is formed, polymerization of the monomers of the hydrophilic phase and polymerization of at least one monomer with formula (I).

The order of steps a) and b) is not important, step b) being able to be done before step a).

The at least one monomer of step a) corresponds to the monomers mentioned above to define the water-soluble (co)polymer.

The polymerization of step d) is advantageously initiated by introducing at least one radical initiator.

According to the invention, the hydrophilic phase may comprise one or more structure agents.

In the case where the polymerization of the at least one monomer of formula (I) occurs at the same time as the formation, by the polymerization of the water-soluble (co)polymer, the monomer of formula (I) preferably has an HLB value of less than 4.5, and advantageously greater than or equal to 1.

According to the invention, the lipophilic phase may comprise one or several water-in-oil surfactants not supporting polymerizable functions of the vinyl function type.

According to the invention, after step d), the water of the hydrophilic phase can be partially or totally eliminated from the dispersion. One example of a water elimination technique is distillation under reduced pressure. This distillation can be continuous or discontinuous, with azeotropic removal. Preferably, the distillation is continuous and a light oil (boiling point of less than 200° C.) is used to facilitate the removal of the water.

According to another particular embodiment of the invention, the polymerization of the interface polymer occurs after the formation, by polymerization, of the water-soluble (co) polymer of the hydrophilic phase. In other words, and more specifically, one particular method for preparing the dispersion of a hydrophilic phase in a lipophilic phase according to the invention comprises the following steps:

aa) Preparing a hydrophilic phase comprising at least one monomer different from the monomer of formula (I), bb) Preparing a lipophilic phase comprising a lipophilic solvent and at least one water-in-oil surfactant not supporting a polymerizable function, cc) Introducing the hydrophilic phase into the lipophilic phase with stirring in order to form a dispersion of hydrophilic phase in lipophilic phase, dd) Once the dispersion is formed, polymerization of the monomers of the hydrophilic phase, ee) Once the polymerization is complete, introducing at least one monomer of formula (I):

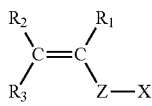

Formula (I)

wherein,

R1, R2, R3 are separately chosen from the group comprising a hydrogen atom, a methyl group, a carboxylate group and Z—X, Z is chosen from the group comprising C(=O)—O; C(=O)—NH; O—C(=O); NH—C(=O)—NH; NH—C(=O)—O; and a saturated or unsaturated, substituted or unsubstituted carbon chain comprising 1 to 20 carbon atoms capable of comprising one or more heteroatoms chosen from nitrogen and oxygen, X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain, ff) Polymerizing at least one monomer of formula (I).

The order of steps aa) and bb) is not important, step bb) being able to be done before step aa).

The at least one monomer of step aa) corresponds to the monomers mentioned above to define the water-soluble (co)polymer.

The polymerization of step dd) is advantageously initiated by introducing at least one radical initiator.

The polymerization of step ff) is advantageously initiated by introducing at least one radical initiator.

According to the invention the hydrophilic phase may comprise one or several structure agents.

According to the invention, in step ee), monomers different from the monomer of formula (I), and/or at least one structure agent, can be introduced into the dispersion with the monomer of formula (I).

According to the invention, step ee) comprises the introduction into the dispersion, with the monomer of formula (I), of at least one monomer different from the monomer of formula (I), and/or at least one structure agent.

According to one particular embodiment of the invention, after step dd) and before step ee), the water of the hydrophilic phase can be partially or totally eliminated from the dispersion. One example of a water elimination technique is distillation under reduced pressure. This distillation can be continuous or discontinuous, with azeotropic removal. Preferably, the distillation is continuous and a light oil (boiling point of less than 200° C.) is used to facilitate the removal of the water.

According to one particular embodiment of the invention, the step for eliminating the water is done after step ee).

Irrespective of their preparation method, the shells comprising the water-soluble (co)polymer can assume liquid or solid form. When the shells comprising the water-soluble (co)polymer are in liquid form, they are preferably in a water-in-oil dispersion form or in a polymer liquid dispersion form. When the shells comprising the water-soluble (co)polymer are in solid form, they are preferably in the form of a powder.

According to one particular embodiment of the invention, the powder form can be obtained by drying the dispersion obtained in step d) or ff). The drying technique may be spray drying, roller drying, microwave drying or fluidized bed drying.

According to another particular embodiment of the invention, the polymerization of the interface polymer is done both during and after the polymerization of the water-soluble (co)polymer.

As previously described, the dispersion may comprise an inversion agent, such as an oil-in-water surfactant. It makes it possible to facilitate the phase inversion when the dispersion is mixed with water or a brine. Generally, they have an HLB value greater than 9, preferably greater than 10, and more specifically between 10 and 18. One skilled in the art knows how to select these inversion agents and to adjust the quantity thereof, as described in document WO 2014/128400.

The inversion agent can be added to the dispersion obtained according to the invention during its preparation or after its preparation, or in the concentrated dispersion or in the solid form obtained after drying of the dispersion.

Enhanced Oil and/or Gas Recovery Method

Another aspect of the invention relates to an enhanced oil and/or gas recovery method using the aforementioned dispersion.

The composition (dispersion) obtained according to the invention has the functionality of viscosifying the waters injected into the reservoirs containing oil or gas to ensure mobility control without recourse to crosslinking, i.e. an inter-chain chemical bridge, being necessary.

More specifically, the present invention also relates to an enhanced oil or gas recovery method, by flushing an underground formation, comprising the injection, in the underground formation, of an aqueous injection fluid obtained by adding, into a water or brine, the dispersion of a hydrophilic phase into a lipophilic phase obtained according to the invention, or its concentrated form after elimination of part of the water, or its solid form obtained after drying of said dispersion.

In this method, the interface polymer degrades with time under the temperature and/or pH conditions of the underground formation, thus freeing the water-soluble (co)polymer once in the reservoir.

Irrespective of the form used (dispersion, concentrated dispersion or solid form obtained from the dispersion), the shell's protective effect takes effect and the polymers are thus protected from chemical and mechanical degradation, in particular during the injection.

In other words, and more specifically, the enhanced oil and/or gas recovery method according to the invention comprises the following steps:

Preparation, according to the invention, of an aqueous injection fluid by addition in a water or in a brine of the dispersion of a hydrophilic phase in a lipophilic phase, or its concentrated form after elimination of part of the water, or its solid form obtained after drying of said dispersion, Injection of injection fluid into an underground formation, Flushing of the underground formation using the fluid injected, Recovery of an aqueous and hydrocarbon mixture (oil and/or gas).

According to the invention, the injection fluid advantageously comprises between 30 ppm and 50,000 ppm of the dispersion or of the concentrated dispersion or of the solid form obtained from the dispersion, more advantageously between 100 and 30,000 ppm, and still more advantageously between 300 and 15,000 ppm.

According to the invention, the injection fluid advantageously comprises between 10 ppm and 15,000 ppm of water-soluble (co)polymer, more advantageously between 50 and 10,000 ppm, and even more advantageously between 100 and 5,000 ppm.

"Water-soluble (co)polymer" refers to a (co)polymer that is soluble in water under normal usage conditions, that is to say, at least at the concentrations indicated above.

Thus, the water-soluble (co)polymer comprised in the hydrophilic phase is protected by the shell formed by at least one interface polymer obtained by the polymerization of at least one monomer of formula (I), the shell being able to be degraded under the temperature and/or pH conditions of the underground formation.

The method according to the invention allows preserving the polymer from mechanical and chemical degradations related to the preparation of the composition injected with the polymer, and to its injection, while preserving good injectivity and excellent flushing of the underground formation.

Indeed, the interface polymer makes it possible to protect the water-soluble (co)polymer comprised in the hydrophilic phase from the shear generated by the preparation and the injection of the injection fluid and from the chemical degradation related to the oxygen, metals, $H_2S$.

Once the injection fluid is injected, the water-soluble (co)polymer is released, and this is done after the degradation of the shell formed by the interface polymer under the temperature and/or pH conditions of the underground formation. Thus, the flushing is done by an aqueous composition comprising at least one water-soluble (co)polymer not having undergone mechanical or chemical degradations.

Without wishing to be bound to any one theory, the formation of the injection fluid by introducing the dispersion obtained according to the invention does not make it possible to release the water-soluble (co)polymer from its shell, even in the presence of a reverser (oil-in-water surfactant). The pH and/or the temperature of the underground formation allow the hydrolysis of the interface polymer and therefore the delayed release of the fully water-soluble (co) polymer. Unlike conventional EOR methods, the present invention does not allow the release of the water-soluble (co)polymer during the formation of the injection fluid.

The invention and the advantages deriving therefrom will be better understood from the following figures and examples in order to provide a non-limiting illustration of the invention.

EXAMPLE EMBODIMENTS OF THE INVENTION

Example 1

Part A: Preparation of Monomer X1 Corresponding to Formula (I)

0.16 g of glycidyl methacrylate (97%) is added to 20.0 g of diethanolamide oleyl (Witcamide 511—Akzo nobel) with magnetic stirring. The medium is left under stirring for 12 hours at ambient temperature.

Part B: Preparation of a Dispersion According to the Invention

A hydrophilic phase is prepared containing 365.8 g of acrylamide (50%), 24.6 g of acrylic acid (100%), 234.6 g of sodium salt of acrylamide tertiary butyl sulfonic acid (50%), 29.0 g of deionized water, 25.9 g of sodium hydroxide (50%), 1.6 g of an aqueous solution of sodium hypophosphite (5 g/L), 0.94 g of tert-butyl hydroperoxide (0.7%), 0.40 g of pentasodium salt of diethylenetriaminepentaacetic acid (Versenex 80) dispersed in a mixture of 280 g of D100s aliphatic hydrocarbon (Exxsol D100) and 20 g of monomer X1. The pH is adjusted to 6.50.

After homogenization and deoxygenation by nitrogen for 30 minutes, the polymerization is initiated by adding a solution of sodium bisulfite.

Example 2

Part A: Preparation of Monomer X2 Corresponding to Formula (I)

15.7 g of glycidyl methacrylate (97%) is added dropwise to 20.0 g of diethanolamide oleyl (Witcamide 511—Akzo nobel) with magnetic stirring. The medium is left under stirring for 12 hours at ambient temperature.

Part B: Preparation of a Dispersion without Interface Polymer (Counterexample)

A hydrophilic phase is prepared containing 363.8 g of acrylamide (50%), 24.6 g of acrylic acid (100%), 234.6 g of sodium salt of acrylamide tertiary butyl sulfonic acid (50%), 29.0 g of deionized water, 25.9 g of sodium hydroxide (50%), 1.6 g of an aqueous solution of sodium hypophosphite (5 g/L), 0.94 g of tert -butyl hydroperoxide (0.7%), 0.40 g of pentasodium salt of diethylenetriaminepentaacetic acid (Versenex 80) dispersed in a mixture of 280 g of D100s aliphatic hydrocarbon (Exxsol D100) and 20 g of diethanolamide oleyl (Witcamide 511—Akzo nobel). The pH is adjusted to 6.50.

After homogenization and oxygenation by nitrogen for 30 minutes, the polymerization is initiated by adding a solution of sodium bisulfite.

Part C: Preparation of a Dispersion according to the Invention 36 g of acrylamide (50%), 1.6 g of tert-butyl hydroperoxide (0.7%) and 0.6 g of monomer X2 are added to the dispersion obtained in part B. The formation of the interface polymer, by polymerization of X2, is initiated by adding a solution of sodium bisulfite (radical initiator).

Example 3—Release of Chains Measured by Rheology

Aqueous solutions at 1% (10,000 ppm) by weight of polymer are prepared by adding a dispersion prepared according to the invention, described in examples 1 and 2, under vigorous stirring in a synthetic seawater.

Figure 1:
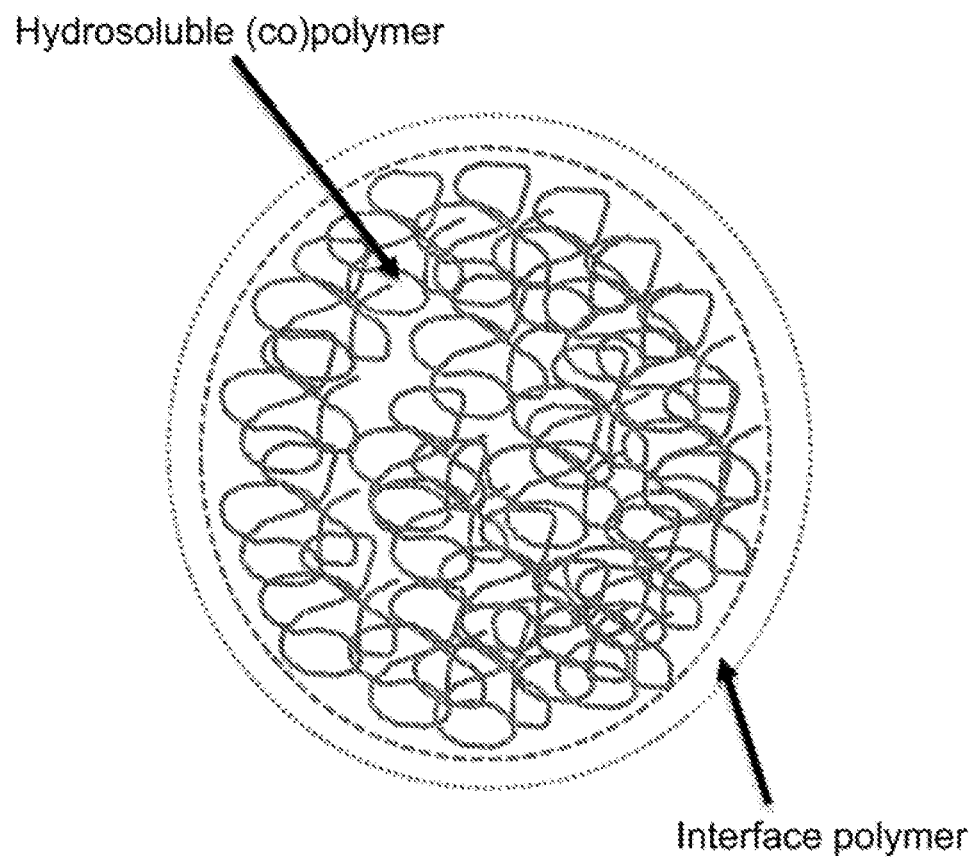
FIG. 1 is a schematic illustration of water-soluble polymers in a shell, prepared according to the invention.
Figure 2:
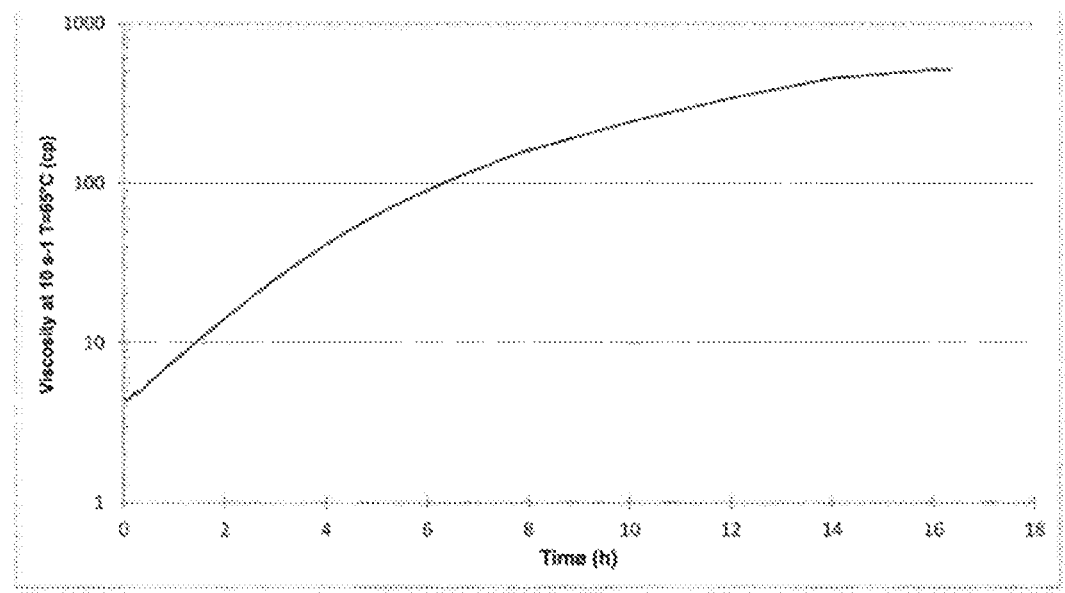
FIG. 2 illustrates the release of the water-soluble polymers from the dispersion of example 1, measured by the increase in the viscosity.
Figure 3:
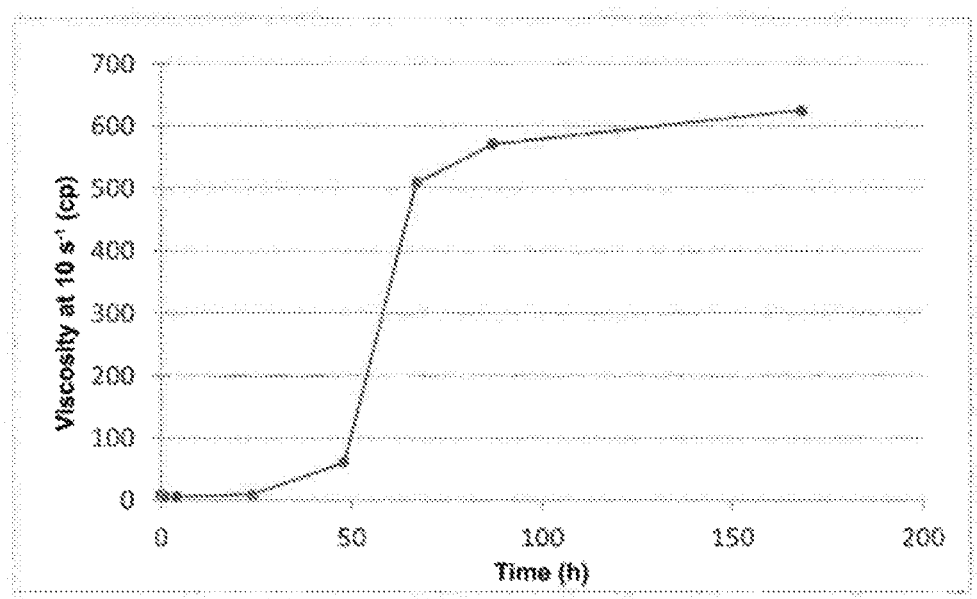
FIG. 3 illustrates the release of the water-soluble polymers from the dispersion of example 2, measured by the increase in the viscosity.

The solutions are placed in an oven at 58° C. and their viscosities are measured regularly using a Kinexus Pro+ from Malvern Instruments. The increased viscosity visible in FIGS. 2 (pH=8.0) and 3 (pH=6.2) comes from the release of the water-soluble polymer.

Example 4—Protection from Mechanical Degradation

To demonstrate the mechanical protection of the polymer provided by the shell, aqueous solutions with 1000 ppm of polymer of example 2, with and without shell (prepared according to the invention and counterexample), were prepared in synthetic seawater. The solutions were sheared by passing them in a pipe with a small section at different pressures. The samples are next collected upon leaving the pipe and the viscosity at 7.3 s$^{-1}$ is measured at 25° C. on a Kinexus Pro+ from Malvern Instruments. The shear gradient is determined by measuring the flow upon leaving the pipe.

Figure 4:
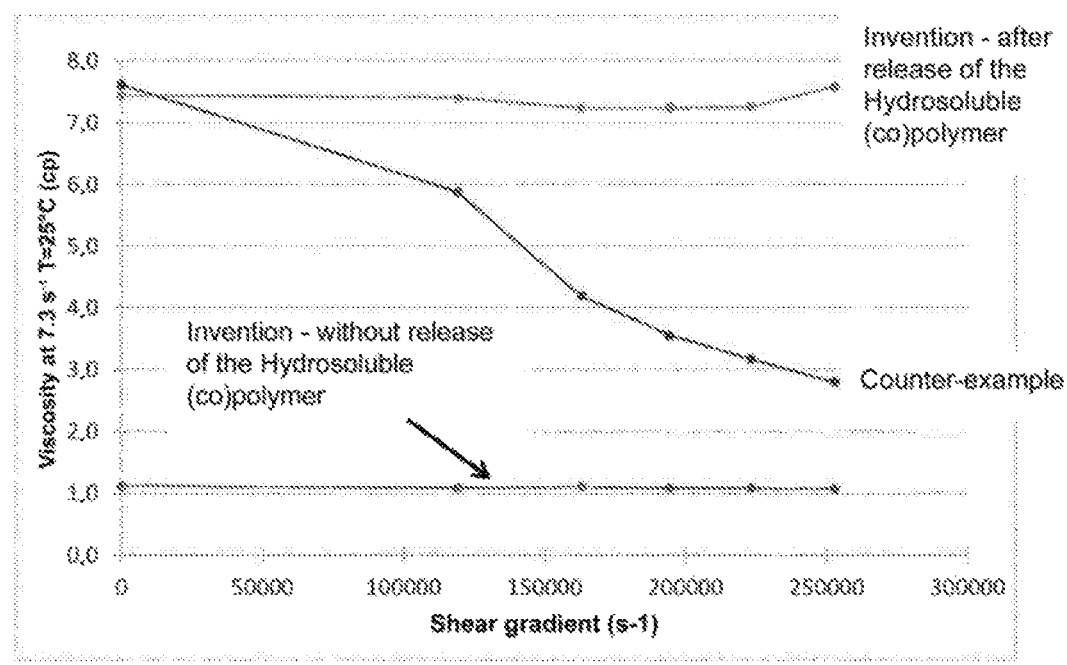
FIG. 4 illustrates the viscosity, as a function of the shear, of the dispersion of example 2, with the shell formed by the interface polymer, without shell and after release of the water-soluble (co)polymer.

The data are shown in FIG. 4. The polymer without shell is quickly degraded. The polymer solutions with a shell keep constant viscosities very close to 1.0 cp. Each of the solutions prepared according to the invention having been collected after shear, that is to say, at each reading point, are, after measuring the viscosity, next activated by being placed in an oven at 58° C. for 4 days. Their viscosities after release of the water-soluble polymer are then measured. They remain very close to the viscosities of the non-sheared solutions with no initial shell.

TABLE 1

Viscosity of the polymer solution at 7.3 s$^{-1}$, T = 25° C. (cp) as a function of the shear (FIG. 4).

| | Shear gradient (s$^{-1}$) | | | | | |
|---|---|---|---|---|---|---|
| | 0 | 119000 | 163000 | 195000 | 223000 | 253000 |
| P1: Viscosity of the polymer without shell | 7.6 | 5.9 | 4.2 | 3.5 | 3.2 | 2.8 |
| P2: Viscosity of the polymer with shell | 1.1 | 1.1 | 1.1 | 1.1 | 1.1 | 1.1 |
| P3: Viscosity of the polymer after degradation of the shell | 7.4 | 7.4 | 7.2 | 7.2 | 7.2 | 7.6 |

The invention claimed is:

1. A method for preparing a dispersion of a hydrophilic phase, comprising at least one water-soluble (co)polymer, in a lipophilic phase, comprising the following steps:
   a) preparing a lipophilic phase comprising a lipophilic solvent and at least one monomer of formula (I):

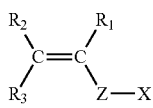

Formula (I)

wherein,
   R1, R2, R3 are separately chosen from the group consisting of a hydrogen atom, a methyl group, a carboxylate group and Z—X,
   Z is chosen from the group consisting of C(=O)—O; C(=O)—NH; O—C(=O); NH—C(=O)—NH; NH—C(=O)—O; and a saturated or unsaturated, substituted or unsubstituted carbon chain comprising 1 to 20 carbon atoms capable of comprising one or more heteroatoms chosen from nitrogen and oxygen,
   X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain, b) preparing a hydrophilic phase comprising at least one monomer different from the monomer of formula (I),
   c) introducing the hydrophilic phase into the lipophilic phase with stirring in order to form a dispersion of hydrophilic phase in lipophilic phase, and
   d) once the dispersion is formed, polymerization of the monomers of the hydrophilic phase and polymerization of at least one monomer of formula (I).

2. The method according to claim 1, wherein the water-soluble (co)polymer is obtained from at least one nonionic monomer and/or at least one anionic monomer and/or at least one cationic monomer and/or at least one zwitterionic monomer.

3. The method according to claim 2, wherein the nonionic monomer is chosen from the group consisting of acrylamide, methacrylamide, N-isopropylacrylamide, N,N-dimethylacrylamide, N-methylolacrylamide, N-vinylformamide, N-vinyl acetamide, N-vinylpyridine, N-vinylpyrrolidone, acryloyl morpholine, glycidyl methacrylate, glyceryl methacrylate and diacetone acrylamide.

4. The method according to claim 2, wherein the anionic monomer is chosen from the group consisting of 3-sulfopropyl methacrylate salts, and non-salified, partially or totally salified monomers chosen from acrylic acid, methacrylic acid, itaconic acid, maleic acid, acrylamido tertiary butyl sulfonic acid, vinylsulfonic acid, and vinylphosphonic acid.

5. The method according to claim 1, wherein the water-soluble (co)polymer is linear or structured.

6. The method according to claim 1, wherein at least one nonionic monomer and/or at least one anionic monomer and/or at least one cationic monomer is polymerized with the monomer of formula (I).

7. The method according to claim 1, wherein the monomer of formula (I) has the following formula:

Formula (I)

wherein,
R1, R2, R3 separately are a hydrogen atom or a methyl group,
Z is chosen from the group consisting of CH$_2$, C(=O)—O, C(=O)—NH, and —(C=O)—O—CH$_2$—CH(OH)—CH$_2$,
X is a group chosen from the alkanolamides and sorbitan esters; and comprising a saturated or unsaturated, linear, branched or cyclic, optionally aromatic, hydrocarbon chain.

8. The method according to claim 1, wherein the monomer of formula (I) is chosen from sorbitan monooleate (meth)acrylate, diethanolamide monooleate 2-hydroxypropyl (meth)acrylate, or sorbitan monooleate glyceryl (meth)acrylate.

9. The method according to claim 1, wherein the monomer of formula (I) has the following formula:

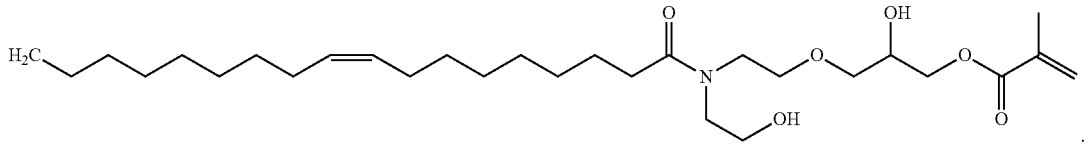 [SMILES: C=C(C)C(=O)OCC(O)COCCN(CCO)C(=O)CCCCCCC/C=C\CCCCCCCC]

10. A method for enhanced oil or gas recovery, by flushing an underground formation, comprising injecting in the underground formation an injection fluid comprising the dispersion of a hydrophilic phase in a lipophilic phase obtained according to claim 1.

11. The method according to claim 10, comprising the following steps:
preparing the injection fluid from the dispersion of a hydrophilic phase in a lipophilic phase, with water or brine,
injecting the injection fluid into an underground formation, and
flushing of the underground formation using the fluid injected.

12. A method for preparing a dispersion of a hydrophilic phase, comprising at least one water-soluble (co)polymer, in a lipophilic phase, comprising the following steps:
aa) preparing a lipophilic phase comprising a lipophilic solvent and at least one water-in-oil surfactant not bearing a polymerizable function,
bb) preparing a hydrophilic phase comprising at least one monomer different from the monomer of formula (I),
cc) introducing the hydrophilic phase into the lipophilic phase with stirring in order to form a dispersion of hydrophilic phase in lipophilic phase,
dd) once the dispersion is formed, polymerization of the monomers of the hydrophilic phase,
ee) once the polymerization is complete, introducing at least one monomer of formula (I),

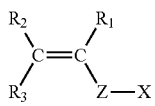 Formula (I)

wherein,
R1, R2, R3 are separately chosen from the group consisting of a hydrogen atom, a methyl group, a carboxylate group and Z—X,
Z is chosen from the group consisting of C(=O)—O; C(=O)—NH; O—C(=O); NH-C(=O)—NH; NH—C(=O)—O; and a saturated or unsaturated, substituted or unsubstituted carbon chain comprising 1 to 20 carbon atoms capable of comprising one or more heteroatoms chosen from nitrogen and oxygen,
X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain,
ff) polymerizing at least one monomer of formula (I).

13. The method according to claim 12, wherein step ee) comprises the introduction into the dispersion, with the monomer of formula (I), of at least one monomer different from the monomer of formula (I), and/or at least one structure agent.

14. The method according to claim 12, wherein the water-soluble (co)polymer is obtained from at least one nonionic monomer and/or at least one anionic monomer and/or at least one cationic monomer and/or at least one zwitterionic monomer.

15. The method according to claim 14, wherein the nonionic monomer is chosen from the group consisting of acrylamide, methacrylamide, N-isopropylacrylamide, N,N-dimethylacrylamide, N-methylolacrylamide, N-vinylformamide, N-vinyl acetamide, N-vinylpyridine, N-vinylpyrrolidone, acryloyl morpholine, glycidyl methacrylate, glyceryl methacrylate and diacetone acrylamide.

16. The method according to claim 14, wherein that the anionic monomer is chosen from the group consisting of 3-sulfopropyl methacrylate salts, and non-salified, partially or totally salified monomers chosen from acrylic acid, methacrylic acid, itaconic acid, maleic acid, acrylamido tertiary butyl sulfonic acid, vinylsulfonic acid, and vinylphosphonic acid.

17. The method according to claim 12, wherein the water-soluble (co)polymer is linear or structured.

18. The method according to claim 12, wherein at least one nonionic monomer and/or at least one anionic monomer and/or at least one cationic monomer is polymerized with the monomer of formula (I).

19. The method according to claim 12, wherein the monomer of formula (I) has the following formula:

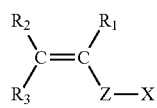 Formula (I)

wherein,
R1, R2, R3 separately are a hydrogen atom or a methyl group,
Z is chosen from the group consisting of CH$_2$, C(=O)—O, C(=O)—NH, and —(C=O)—O—CH$_2$—CH(OH)—CH$_2$,
X is a group chosen from the alkanolamides and sorbitan esters; and comprising a saturated or unsaturated, linear, branched or cyclic, optionally aromatic, hydrocarbon chain.

20. The method according to claim 12, wherein:
the monomer of formula (I) is chosen from sorbitan monooleate (meth)acrylate, diethanolamide monooleate 2-hydroxypropyl (meth)acrylate, or sorbitan monooleate glyceryl (meth)acrylate; or
the monomer of formula (I) has the following formula:
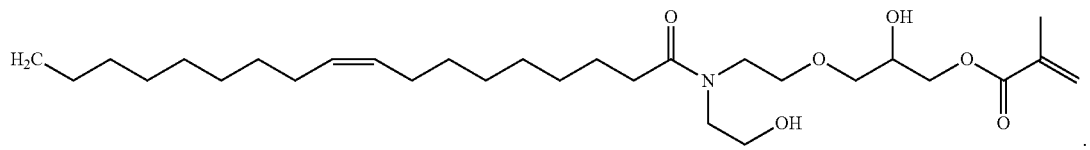 [SMILES: C=C(C)C(=O)OCC(O)COCCN(CCO)C(=O)CCCCCCC/C=C\CCCCCCCC]
* * * * *